United States Patent [19]

Bala et al.

[11] 4,398,233

[45] Aug. 9, 1983

[54] FAIL-SAFE DEVICE FOR ELECTRONIC CONTROL CIRCUIT

[75] Inventors: John L. Bala, Scituate; Charles R. Boswell, Boston, both of Mass.

[73] Assignee: Electronics Corporation of America, Cambridge, Mass.

[21] Appl. No.: 354,352

[22] Filed: Mar. 3, 1982

[51] Int. Cl.³ .............................................. H02H 3/00
[52] U.S. Cl. .................................... 361/78; 361/156; 364/186
[58] Field of Search ............................ 361/1, 78, 156; 364/184, 185, 186, 737, 740

[56] References Cited

U.S. PATENT DOCUMENTS 3,660,680  5/1972  Grundy .
3,787,838  1/1974  Feintuch et al. .
3,958,126  5/1976  Bryant .

FOREIGN PATENT DOCUMENTS

EP11312  5/1980  European Pat. Off. ............ 364/186

*Primary Examiner*—Harry E. Moose, Jr.
*Attorney, Agent, or Firm*—Charles E. Pfund

[57] ABSTRACT

A fail-safe device is disclosed for removing power from circuitry to be controlled upon the occurrence of an undesired operating condition. The device includes circuitry for generating a fail-safe signal that is normally within a predetermined frequency range unless there is an undesired operating condition. It also includes power control circuitry for supplying power to the circuitry to be controlled only when the fail-safe signal is within the predetermined frequency range. In a preferred embodiment, the circuitry for generating the fail-safe signal includes a programmable computer which regulates the circuitry to be controlled and which, unless there is an undesired operating condition, such as a failure of the computer, also generates a sequence of bits in which a predetermined pattern occurs at a known frequency. A comparater circuit compares this sequence of bits with the predetermined pattern and generates a variation in the fail-safe signal each time there is a match. In the preferred embodiment, the power control means includes an electromechanical relay for supplying power to the circuitry to be controlled when that relay is turned on and relay actuating circuitry for keeping the relay turned on when the fail-safe signal is within the predetermined frequency range. The power control circuitry may also include latch-out circuitry for keeping the relay off once it has been turned off and reset circuitry for enabling the relay to be selectively turned on once it has been turned off.

52 Claims, 12 Drawing Figures

FAIL-SAFE DEVICE FOR ELECTRONIC CONTROL CIRCUIT

FIELD OF THE INVENTION

This invention relates to electrical control circuits and more particularly to a fail-safe device for removing power from circuitry to be controlled upon the occurrence of an undesired operating condition, such as a failure in the circuitry which regulates such controlled circuitry.

BACKGROUND OF THE INVENTION

The use of electronic control circuits is widespread in the prior art, and is becoming even more widespread as the cost and size of electronic components decreases and as the power of those components increases. Such circuits have been used to control devices as varied as microwave ovens, industrial robots, chemical processing facilities, industrial furnaces, medical life-support systems, and spacecraft, such as the Space Shuttle. As the responsibility entrusted to such circuits increases, so does the need that such circuits be fail-safe. For example, if the control circuit of a large industrial furnace used an electric power plant fails to cut-off the supply of fuel to the burner of that furnace after its flame has gone out, an explosion could result that would do millions of dollars worth of property damage and that could kill many lives. Thus it is important to design electronic control circuitry that is fail-safe, so that if it fails, it will do so in a manner that is safe.

A good example of a fail-safe control circuit in the prior art is disclosed in U.S. Pat. No. 3,958,126 issued to Jack Bryant and having the same assignee as the present application. This control circuit regulates the supply of fuel to a burner by means of solenoids that require electric power to keep their respective fuel valves open. Thus, if, for any reason, power is removed from such solenoids, the burners fuel lines will be shut off, as safety requires. In the Bryant circuit, power is supplied to these solenoids through the normally open contacts of an electromechanical relay. This is much safer than supplying power to such solenoids through solid state relays, since it is more common for solid state relays to short circuit, which would keep fuel valves dangerously open, than it is for mechanical relays. The Bryant circuit further includes a relay actuating circuit, comprising a switching transistor, two capacitors, two diodes, and a resistor, associated with each of its fuel line control relays. Each relay actuating circuit supplies power to its associated relay only when that actuating circuit is supplied with a fail-safe signal having a certain minimum frequency. This fail-safe signal is generated only when the control circuit determines that it is safe to keep the fuel valves open. The requirement of a fail-safe signal that varies at a minimum frequency further increases the fail-safe nature of the Bryant circuit, since it is less likely for circuitry to fail in a manner that generates a continuously varying signal then it is for it to fail in a manner that produces either a high or a low signal level.

Although circuitry of the type disclosed in the Bryant patent provides significant fail-safe features, it nevertheless leaves room for improvement. For example, it is possible for some types of electronic components to fail in a manner which causes them to generate a signal that varies, either continuously or intermittently, above the minimum frequency necessary to operate a relay actuating circuit of the type shown in the Bryant patent. Thus such actuating circuits can be caused to misoperate in a dangerous fashion by a broad range of possible erroneous signals.

SUMMARY OF THE INVENTION

It is an object of the present invention to provide a fail-safe device, for removing power from circuitry to be controlled upon the occurrence of an undesired operating condition, which overcomes the above-mentioned disadvantages in the prior art.

It is a further object of the present invention to provide such a fail-safe device, which, if it fails, is very unlikely to continue to supply power to the circuitry to be controlled.

It is still a further object of the present invention to provide such a fail-safe device for continuously removing power from circuitry to be controlled upon the intermittent occurrence of an undesired operating condition.

It is still a further object of the present invention to provide such a fail-safe device for use with computer controlled circuitry.

Further objects and advantages of the present invention are evident in the specification and claims which follow.

According to an aspect of the present invention, a fail-safe device is provided for removing power from circuitry to be controlled upon the occurrence of an undesired operating condition, such as a failure in the electronics which are used to regulate that circuitry. The fail-safe device includes means for generating a fail-safe signal which varies between signal levels at a frequency in a predetermined range unless there is an undesired operating condition, and it also includes power control means responsive to the fail-safe signal for supplying power to the circuitry to be controlled only when the fail-safe signal has a frequency within the predetermined range.

According to an aspect of the invention, the means for generating a fail-safe signal includes means for generating a sequence of binary bits in which a predetermined pattern of bits appears at a frequency within a range corresponding to the predetermined frequency range of the fail-safe signal, unless there is an undesired operating condition. A comparator means is provided for receiving this sequence of binary bits for repeatedly comparing that sequence with a reference pattern, and for generating an output which varies in signal level in response to a match between the sequence and the reference pattern. In a preferred embodiment this means for generating a sequence of binary bits may include a programmable computing means for controlling the circuitry to be controlled. Such a computing means has a memory means which contains bit-transmit instructions for causing the computing means to generate the sequence of binary bits unless there is an undesired operating condition. In such a preferred embodiment the comparator means includes a shift register with a serial input and a parallel output for receiving the succession of bits generated by the computing means. Such a comparator means also includes a comparator having two parallel inputs, one of which is supplied with a reference pattern and the other of which receives as its input the parallel output of the shift register.

According to another aspect of the invention the power control means includes an electromechanical relay for supplying power to the circuitry to be controlled and a relay actuating means. The electromechanical relay has an electromagnet and normally open mechanical relay contacts through which power is supplied to the circuitry to be controlled. The normally open contacts remain open unless a sufficient current is supplied to the electromagnet to keep them closed. The relay actuating means has power terminals and is designed to supply sufficient current to the electromagnet to keep its normally open contacts closed when both power is supplied to the power terminals of the relay actuating means and the fail-safe signal has a frequency in the predetermined range.

According to another aspect of the invention the power control means further includes latch-out means for preventing the electromagnet from closing its normally open contacts once those contacts have been opened. For example, in a preferred embodiment the latch-out means includes means for supplying power to the relay actuating means through the normally open contacts of the relay, so that once those contacts are open the relay actuating means no longer receives power, and the relay enters latch-out. According to this aspect of the invention the power control means further includes reset means for selectively supplying sufficient current to the electromagnet to close the normlly open contacts and terminate the latch-out.

According to still another aspect of the invention a relay actuating means is provided which includes a switching means for switching between a first and second signal state in response to signal level variations of the fail-safe signal. In conjunction with such a switching means a storage capacitor is provided, as are means for charging the storage capacitor when the switching means is in it first signal state, and means for discharging the storage capacitor through the electromagnet of the electromechanical relay, so as to supply current to that electromagnet when the switching means is in its second state.

According to yet another aspect of the present invention, a relay actuating means is provided which has a lowpass means for transmitting only signal level variations of the fail-safe signal which occur below a maximum frequency.

DESCRIPTION OF THE DRAWINGS

These and other aspects of the present invention will become more clear upon reading the following description of the preferred embodiment in conjunction with the accompanying drawings, in which.

DETAILED DESCRIPTION OF THE PREFERRED EMBODIMENT

Figure 1:
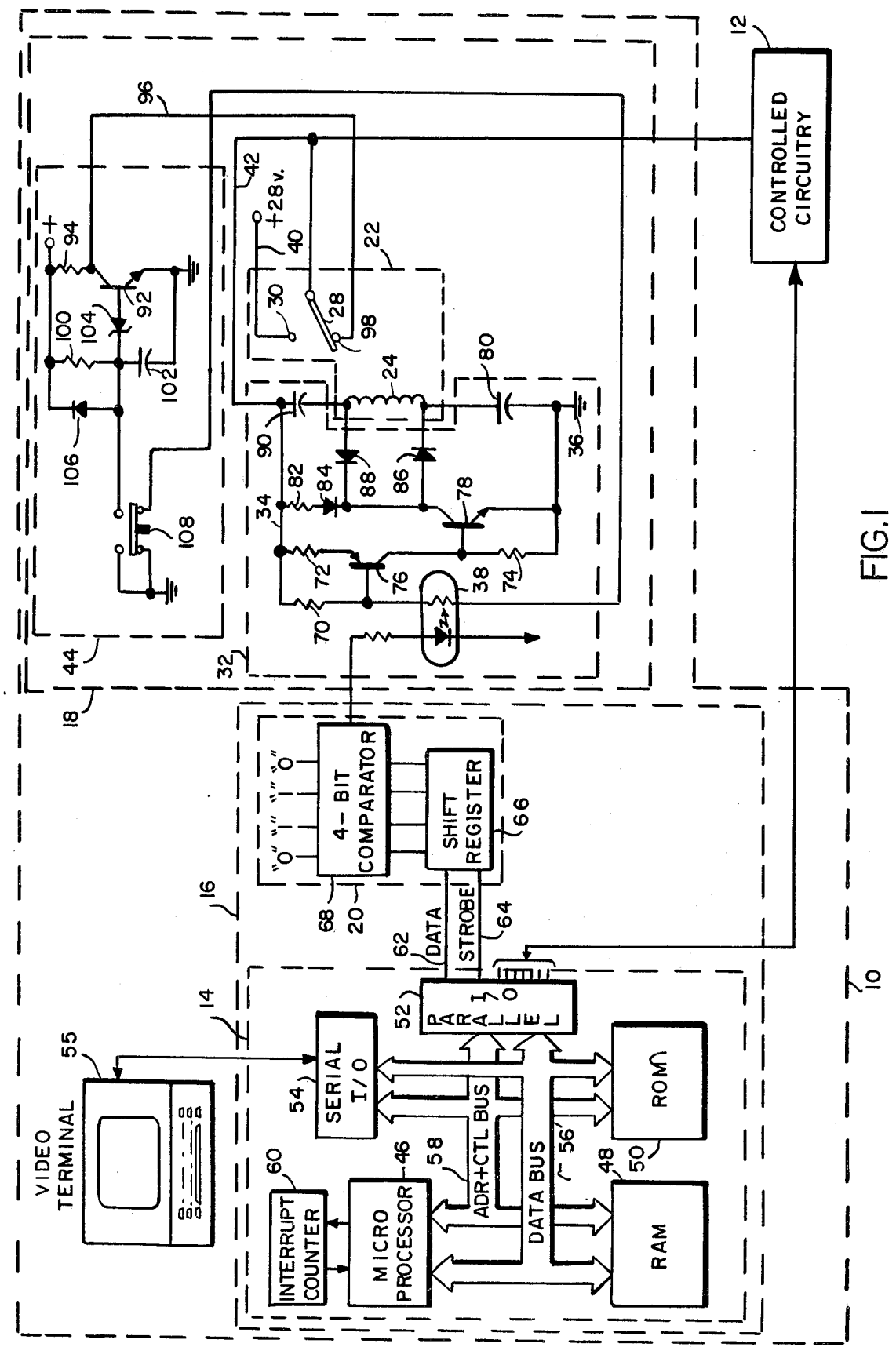
FIG. 1 is a schematic diagram of a fail-safe device according to a preferred embodiment of the present invention.

Referring to FIG. 1, a fail-safe device 10, emboding the present invention is shown. Fail-safe device 10 is designed to remove power from circuitry to be controlled, such as circuitry 12, upon the occurrence of an undesired operating condition, such as a functional error of the computer 14 which is used to regulate circuitry 12. Fail-safe device 10 can be used to regulate a wide variety of different type of circuits. For example, if the fail-safe device is used to regulate a burner control system, control circuitry 12 could include fuel valve solenoids for the purpose of regulating the supply of fuel to a burner.

Fail-safe device 10 is comprised of means 16 for generating a fail-safe signal and power control means 18 for supplying power to the circuitry 12 to be controlled. Means 16 generates a fail-safe signal which normally varies between signal levels at a frequency in a predetermined range between a maximum and a minimum frequency value, unless there is an undesired operating condition. Power control means 18 is responsive to the output of means 16 for supplying power to controlled circuitry 12 only when the fail-safe signal has a frequency in the predetermined range.

Means 16 includes computer 14, which generates a sequence of binary bits in which a predetermined pattern of bits appears at a frequency within a range corresponding to the predetermined range of the fail-safe signal unless there is an undesired operating condition detected in computer 14. Means 16 also includes comparator means 20 for receiving the sequence of binary bits produced by computer 14, for repeatedly comparing that sequence with a reference pattern, and for generating an output which varies in signal level in response to a match between the sequence and the reference pattern.

Power control means 18 includes an electromechanical relay 22 for supplying power to controlled circuitry 12. Relay 22 has an electromagnet 24 and normally open mechanical relay contacts 28 and 30 through which power is supplied to controlled circuitry 12. Normally open contacts 28 and 30 remain open unless a sufficient current is supplied to electromagnet 24 to close the gap between those two contacts. Power control means 18 also includes a relay actuating means 32 which has power terminals 34 and 36 and which has low pass means 38 for transmitting only signal level variations in the output of comparator means 20 which occur below the maximum frequency of the predetermined frequency range of the fail-safe signal. Actuating mean 32 is designed to supply sufficient current to electromagnet 24 to keep normally open contacts 28 and 30 closed only when both of the following two conditions are met: (1) Power is supplied to power terminals 34 and 36 of the actuating means, and (2) the output of comparator means 20 has a frequency in the proper predetermined range. Power control means 18 also includes latch-out means for preventing a sufficient current from being supplied to electromagnet 24 to close contacts 28 and 30 once those contacts have been opened. This latch-out means has means, including the connection 40 between the twenty-eight volt power supply and contact 28, and the connection between the contact 30 and positive power terminal 34 of actuating means 32, for supplying power to actuating means 32 through contacts 28 and 30, so that, once those contacts are open, the relay actuating means does not receive power and relay 22 enters latch-out. The latch-out means also include reset means 44 for selectively supplying sufficient current to electromagnet 24 to close the normally open contacts 28 and 30 and to terminate latch-out.

Computer 14 is based around a microprocessor 46, which in the preferred embodiment is an Intel 8085 Microprocessor manufactured by Intel Corporation, of 3065 Bowers Avenue, Santa Clara, Calif. 95051. Computer 14 also includes a random access memory 48 (RAM), a read only memory 50 (ROM), a parallel I/O port 52, and a serial I/O port 54 used to interface computer 14 to a video terminal 55. Microprocessor 46, RAM 48, ROM 50, parallel I/O port 52, and serial I/O port 54 are all interconnected via a data bus 56 and an address and control bus 58. Data bus 56 enables 8 bit parallel data segments, called bytes, to be communicated between microprocessor 46 and any of the other components which are connected to that data bus. Address and control bus 58 enables microprocessor 46 to address the various devices to which that bus is connected and it enables control signals to be passed between the microprocessor and the other components which are connected to bus 58. An interrupt counter 60 is connected to microprocessor 46 for counting the clock pulses which are generated by that microprocessor and for generating an interrupt signal to the microprocessor approximately every 10 milliseconds. As will be recognized by one skilled in the art of microprocessor based computing systems, the elements of the computer 14 and the interconnection of those elements, described above are well known in that art.

I/O port 52, which is comprised of an Intel 8255 programmable peripheral interface chip manufactured by Intel Corporation, listed above, has a shift register data line 62 and a shift register strobe line 64 as two of its outputs. As is described below in greater detail, microprocessor 46 feeds a successive data bit of a three bit pattern "011" to data line 62 of I/O port 52 every 10 millisecond, unless, an undesired operating condition is detected in the performance of the computer 14. Microprocessor 46 also sends a brief strobe pulse out on strobe line 64 during the period that each of the data bits is on data line 62. Thus, during normal operation, computer 14, continuously sends a sequence of strobed data bits having a repeated pattern of "011" to the input of comparator means 20.

Comparator means 20 includes a shift register 66 and a comparator circuit 68. Shift register 66 has a serial data input connected to data line 62 and a strobe input connected to strobe line 64. This enables any value on data line 62 to be shifted into shift register 66 whenever a strobe pulse is present on line 64. Shift register 66 is a four-bit shift register and it has a four-bit parallel output. Comparator 68 is a four-bit comparator and it has two four-bit parallel inputs, one of which is supplied with a hard wired reference pattern containing the bits "0110". This hard wired reference pattern is supplied to comparator 68 by connecting the first and last bits of its reference input to ground and the middle two bits of that reference input to a positive logic voltage. The other four-bit input of comparator 68 is connected to the four-bit output of shift register 66. The output of comparator 68, which is the fail-safe signal, has a high logic level only when all of the four inputs received from shift register 66 match their corresponding bits in the hard wired referenced pattern "0110". Thus when, computer 14 supplies bits from the repeated sequence "011" at a rate of one bit every ten milliseconds to shift register 66, the pattern in that shift register will be "0110" every thirty millisecond. As a result, during normal operation, the fail-safe signal generted by comparator 68 varies between a low and a high logic level once every thirty milliseconds.

The output of comparator 68 is connected to low-pass means 38 of relay actuating means 32. Low-pass means 38 is comprised of a photoresistive optocoupler which has two circuit paths, an input circuit path connecting the output of comparator 68 to ground and containing a light emitting diode which emits light each time the output of comparator 68 goes to a high logic level, and an output path which is connected as part of the circuitry of relay actuating circuit 32 and which varies from its normal high impedance state to a low impedance state when the light emitting diode of the optocoupler's input paths emits radiation. However, it should be noted that the frequency response of the optocoupler 38 is limited. Once the frequency at which the light emitting diode of that optocoupler is turned on and off increases to over 40 cycles per second, the frequency at which its output path changes from a high to a low impedance state actually starts to drop, and if the frequency of the signal applied to the input path of the optocoupler rises above 80 cycles per second, the frequency at which the impedance of the output path varies in substantially reduced.

Relay actuating means 32 includes a switching means for switching between a first and a second signal state in response to the fail-safe signal level variations which are supplied to the optocoupler 38. This switching means is comprised of resistors 70, 72 and 74, and transistors 76 and 78. Resistor 70 is connected in series between positive power terminal 34 of relay actuating circuit 32 and the output path of optocoupler 38. The other side of the output path of optocoupler 38 is normally connected to ground. The junction between the resistor 70 and optocoupler 38 is connected to the base of PNP transistor 76, the emitter of which is connected through a resistor 72 to positive terminal 34. The collector of transistor 76 is connected through resistor 74 to negative power terminal 36 of relay actuating means 32, which has a ground potential. The junction between the collector of transistor 76 and resistor 74 is connected to the base of NPN transistor 78. The emitter of transistor 78 is connected to negative power terminal 36. When the output path of optocoupler 38 is in its high impedance state, the base of transistor 76 is pulled high through resistor 70 and thus that transistor is turned off, preventing current flow through resistor 74 and thus pulling the base of transistor 78 low, which, in turn, turns that transistor off. However, when the output of comparator 68 goes high the output path of optocoupler 38 goes to a low impedance state, which causes current to flow through resistor 70. This causes the voltage supplied to the base of transistor 76 to drop to a sufficiently low level to turn that transistor on, which, in turn, causes current to flow through resistor 74 and, thus, the voltage at the base of transistor 78 to go up sufficiently to turn that transistor on. Thus it can be seen that the output of the comparator 68 causes the switching means comprising transistor 78 to switch between a first state where that transistor is off and a second state where that transistor is on.

The relay actuating means 32 also includes a storage capacitor 80, means, including resistor 82, diode 84 and diode 86, for charging storage capacitor 80 when transistor 78 is off, and means, including diode 88, for discharging storage capacitor 80 through electromagnet 24 when transistor 78 is in an on state. Relay actuating means 32 also includes a capacitor 90 connected between electromagnet 24 and positive terminal 34.

When transistor 78 is off, positive charge travels from terminal 34 through resistor 82 and diodes 84 and 86 to charge up capacitor 80. At this time no significant charge travels through electromagnet 24, since the voltage at the cathode of diode 88 is just as high as that on capacitor 80. However, when transistor 78 turns on, the collector of that transistor, which is connected to the anode of diode 86 and the cathode of 88, drops to a voltage close to ground. This causes the positive charge accumulated on capacitor 80 flows through electromagnet 24, diode 88, and the collector-emitter path of transistor 78 to ground. One such flow of current through relay 24 is not enough to turn that relay on and connect its normally open contacts 28 and 30, but during normal operation of fail-safe circuit 10 the output of comparator 68 causes transistor 78 to switch on and off approximately thirty-three times a second, and thus causes approximately thirty-three current pulses to travel through relay 24 each second. Such a frequency of current pulses is sufficient to switch that relay on and to cause its normally opened contacts 28 and 30 to be connected.

Experimentation with the circuitry shown in FIG. 1 has indicated that the output of comparator 68 has to obtain a minimum frequency of approximately twenty cycles per second for there to be sufficient current through electromagnet 24 to turn relay 22 on. The frequency response of the relay actuating circuit 32 reaches its peak at approximately forty cycles per second, at which frequency the magnitude of the current flowing through electromagnet 24 reaches its peak. When the frequency of the signals supplied to optocoupler 38 increases above eighty cycles per second, the low-pass characteristics of that optocoupler cause the frequency of current pulses through electromagnet 24 to drop below that necessary to keep relay 22 on and contacts 28 and 30 connected. Thus for the circuit shown in FIG. 1, the predetermined frequency range required to keep relay 22 on lies approximately between twenty and eighty cycles per second.

As was stated before, connection 40 supplies a positive twenty-eight volt d/c voltage level to the normally open relay contact 30, and connection 42 connects the normally open relay contact 28 to power terminal 34 of relay actuating means 32. Thus when relay 22 is on, twenty-eight volts is supplied through contacts 28 and 30 to terminal 34. However, if the fail-safe signal from comparator 68 ceases to have a frequency within the predetermined range necessary to keep relay 22 on, that relay will turn off and contacts 28 and 30 will open, preventing power from being supplied to power terminal 34. Thus once relay 22 turns off power is removed from relay actuating circuit 32 and electromagnet 24, causing relay 22 to enter a latch-out state in which that relay will remain off regardless of whether or not the fail-safe signal generated by comparator 68 again re-enters its predetermined frequency range. This latch-out feature of fail-safe device 10 is desirable, since if computer 14 is sufficiently unreliable to cause the fail-safe signal to deviate from the predetermined frequency range, even if it does so only for a brief period, it may well be unsafe to entrust it with the responsibility of controlling circuitry 12.

Reset means 44 of power control means 18 is designed to selectively supply sufficient current to electromagnet 24 to close normally open contacts 28 and 30 and terminate a latch-out condition. This may be desirable to do, for example, after a test has been conducted of computer 14 and it has been determined that it is safe to continue to let it operate circuitry 12. Reset means 44 is also used to supply power to actuating means 32 and relay 22 during the initial power up of power control means 18.

Reset means 44 includes a transistor 92 and a resistor 94. Resistor 94 is connected in series with the collector-emitter path of transistor 92 and a positive twenty-eight volt power supply. A connection 96 is made between the junction of resistor 94 and transistor 92 and the power terminal 34 of relay actuating means 32. Connection 96 is made through a normally closed contact 98 of the relay 22, which is only connected to contact 28 when relay 22 is turned off. Thus when relay 22 is off, as it is in latch-out or when that relay has not yet been turned on, the collector of transistor 92 is connected to positive terminal 34 of relay actuating means 32. A resistor 100 is connected between the positive voltage supply and one end of a timing capacitor 102, which has its other end connected to ground. The junction between resistor 100 and capacitor 102 is connected through a zener diode 104 to the base of transistor 92. The anode of a diode 106 is also connected to the junction between resistor 100 and capacitor 102, and the cathode of that diode is connected to the positive voltage supply. A push button 108 is provided which either connects the output path of optocoupler 38 or the junction between capacitor 102 and resistor 100 to ground. Push button 108 is spring loaded so that it is normally in a position that connects optocoupler 38 to ground, and so that it only connects the junction of resistor 100 and capacitor 102 to ground while it is being pushed by an operator.

When power is first applied to power control means 18 the charge on capacitor 102 is negligable, and thus transistor 92 is off, since there is not enough voltage supplied to the junction between resistor 100 and capacitor 102 to reverse bias zener diode 104 and apply a forward bias to the base-emitter junction of transistor 92, as is required to turn that transistor on. Thus during the initial start-up of power control means 18, transistor 92 is off and the voltage at its collector is pulled high through the one kilohm resistor 94 to approximately twenty-eight volts. This high voltage level is supplied through connection 96, normally closed relay contact 98, and relay contact 28 to positive terminal 34 of relay actuating means 32. At this time, as will be described below, computer 14 is programmed not to emit a high signal from the output of comparator 68, and thus the output path of optocoupler 38 has a high impedance. Therefore the positive voltage supplied to terminal 34 causes capacitor 80 to charge to a high voltage level. Under normal operating conditions, once capacitor 80 has had time to charge up, computer 14 causes the output of comparator 68 to start varying at approximately thirty-three cycles per second, which turns relay 22 on and connects terminal 34 to twenty-eight volts through normally opened relay contact 30.

All during this initialization period positive charge trickles through resistor 100 to charge up capacitor 102. After a small fraction of a second, the charge on capacitor 102 builds to over ten volts, which is sufficient to reverse bias zener diode 104 and thus turn on transistor 92. Once transistor 92 is turned on, the voltage at the collector of that transistor goes low and stays low to prevent power from being supplied to normally closed relay contact 98. This prevents power actuating circuit 32 from receiving power if relay 22 is turned off after initialization, and thus makes it possible for relay to enter latch-out.

If it is desired to terminate a latch-out condition of relay 22, the push button 108 is momentarily pushed, so that it connects the junction of resistor 100 and capacitor 102 to ground. Such a brief connection is sufficient to discharge capacitor 102 and turn transistor 92 off. Thus the reset circuit 44 is returned to a state comparable to that which occurs during initialization, i.e., the voltage at the collector of transistor 92 is high for a small fraction of a second, to enable power to be supplied to positive terminal 34 through the normally closed contact 98, and thus to enable sufficient current to be supplied through electromagnet 24 to turn relay 22 on, provided that the output of comparator 68 is within the predetermined frequency range.

Figure 2:
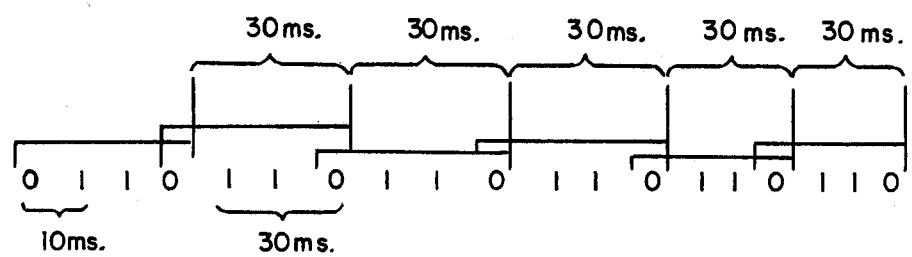
FIGS. 2-4 are schematic representations of bit sequences produced by the computer of the fail-safe device shown in FIG. 1.
Figure 3:
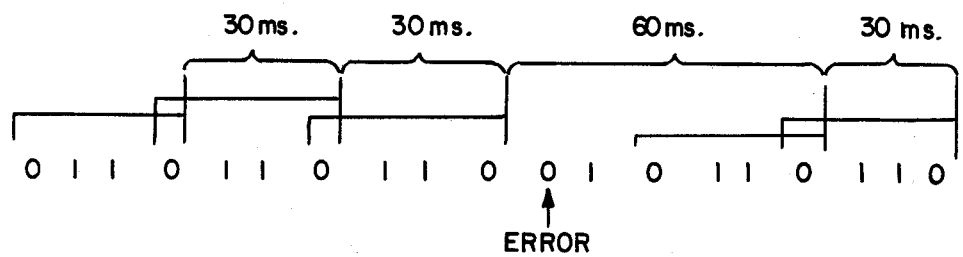
Figure 4:
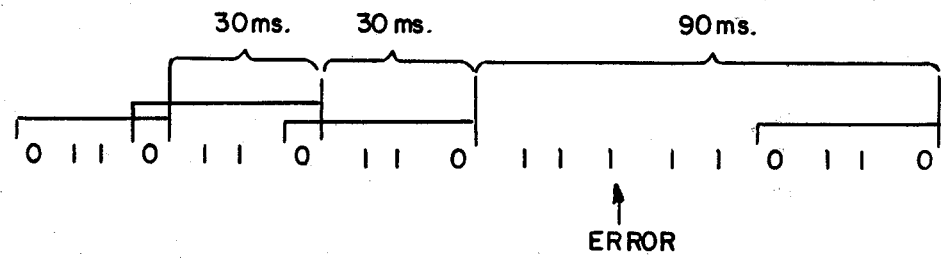

Referring to FIGS. 2 through 4, examples of bit sequences which might be sent by computer 14 over data line 62 to shift register 66 are shown. FIG. 2 shows a data stream in which no errors occur. In such a data stream an individual bit is transmitted every ten milliseconds and every thirty millisecond the bit pattern of "011" is repeated. It can be seen from FIG. 2 that every third millisecond the comparator 68 would find the bit pattern "0110", located in the shift register 66, causing comparator 68 to emit a logical high signal. The bit pattern of FIG. 3 is identical to that of FIG. 2 except that, as is indicted by the arrow labeled "error", one of its bits which should have been a "1" is instead a "0". It can be seen that the occurrence of this one "0" is sufficient to prevent the comparator 68 from emitting a logical high signal level for a period of sixty milliseconds. This period is sufficiently long to enable relay 22 to turn off and the contacts 28 and 30 to open, causing that relay to enter latch-out. The bit sequence of FIG. 4 is identical to that of FIG. 2, except, as is indicated by the arrow labeled "error", one of its bits which should have been a "0" is instead a "1". As is indicated in FIG. 4, this single error is sufficient to prevent comparator 68 from emitting a high signal for a period of ninety milliseconds, which is more than sufficient to cause relay 22 to enter latch-out. As can be seen from FIG. 2, the bit stream which is produced on data line 62 during normal operation is asymmetrical, in that it has a different number of "0"'s and "1"'s. Such an asymmetrical signal is used in fail-safe device 10, because it is considered less likely that computer 14 would accidentaly generate an asymmetrical bit pattern, than that it would generate a symmetrical one, such as "1100".

Referring to the flow charts in FIGS. 5 through 12, the programming of the computer 14 will be discused.

Figure 5:
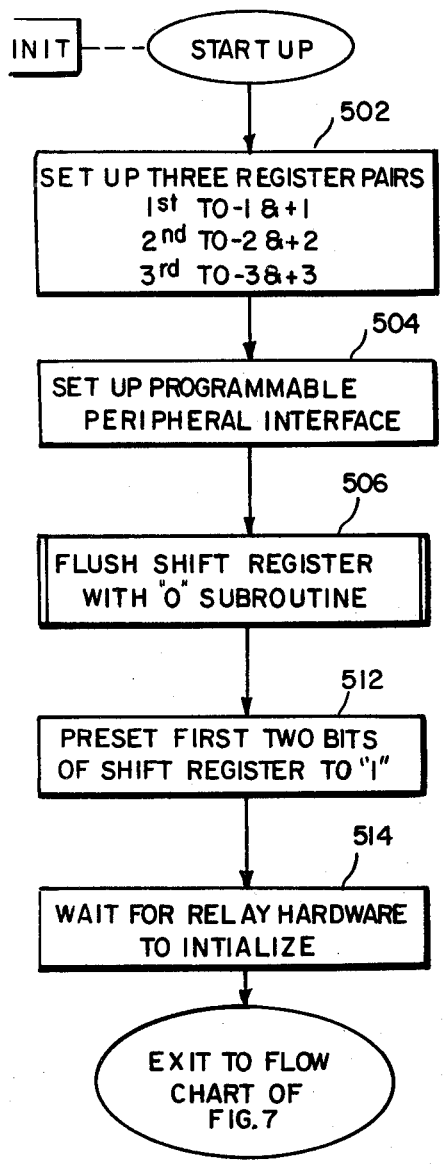
FIGS. 5-12 are schematic flow charts of programming used in the microprocessor of the fail-safe device shown in FIG. 1.

FIG. 5 discloses that part of the initialization program of computer 14 which relates to the present invention. Upon start up, microprocessor 46 executes step 502, which sets up three bit-transmit register pairs with initialization values. Each bit-transmit pair consists of two separate addresses in random access memory 48, each of which holds an eight bit binary value. The first of such pairs is set so that one of its addresses has a value of minus one and the other has a value of plus one. The second of such pairs is set so that one of its addresses has the value of minus two and the other has the value of plus two. And the third of such pairs is set so that one of its addresses has the value of minus three and the other has the value of plus three. Upon the completion of step 502, microprocessor 46 advances to step 504 in which the programmable peripheral interface of parallel I/O port 52 is programmed so that the ports connected to data line 62 and strobe line 64 will function as latched output ports. Description of how to perform such programming upon the Intel 8255 programmable peripheral interface used in the preferred embodiment is contained in the volume entitled *Intel 8080 Microcomputer Systems User Manual,* published by Intel Corporation, at the address listed above, in September of 1975. Once the parallel I/O port 52 has been programmed, the microprocessor 46 advances to step 506 which calls the flush routine disclosed in FIG. 6. In this flush subroutine the microprocessor 46 first performs a step 508 in which it causes a zero level output to be supplied to data line 62. Since parallel I/O port 52 operates so that values feed to it are latched, this zero level signal remains on data line 62 until it is changed by the microprocessor. Once step 508 has been completed the processor executes step 510 in which it issues six separate strobe pulses to the strobe line 64. The microprocessor creates each separate strobe pulse by first placing a high signal on strobe line 64, followed by a low signal on that line, so as to create a pulse which has both a rising and a falling edge. In response to the continued zero output on data line 62 and the six strobe pulses on line 64, shift register 66 is caused to shift in six zero's, which is more than sufficient to clear that register to zero.

Figure 6:
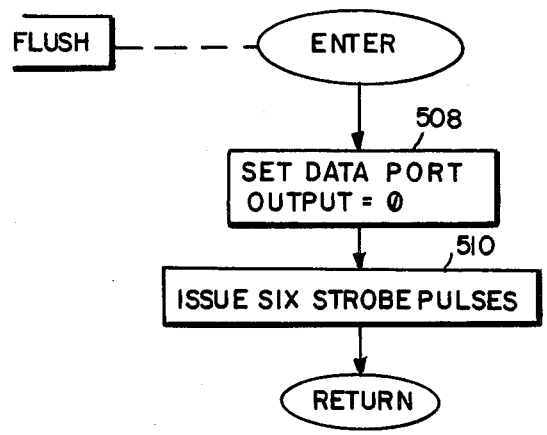

Once the step 510 has been completed the program returns from the flush subroutine of FIG. 6 to the start up subroutine of FIG. 5, whereupon it advances to step 512. In this step two "1" bits are shifted into shift register 66 by means of first setting the data line 62 to a "1" logic level, and then transmitting two strobe pulses on line 64. This is done so that only the transmission of one "0" bit will be required to cause shift register 66 to have its first occurrence of the pattern "0110". Once this is completed, the program advance to step 514, in which the processor waits for a small number of milliseconds to allow sufficient charge to flow from the reset circuit 44, through normally closed contact 98 to capacitor 80. This enables that capacitor to charge up before comparator 68 causes the output path of optocoupler 38 to be switched to low impedance state, which would divert charge away from capacitor 80. After the delay period of step 514 has elapsed and capacitor 80 has had a chance to charge, the program of microprocessor 46 exits the startup routine shown in FIG. 5 and commences to perform its main program indicated schematicly in FIG. 7.

Figure 7:
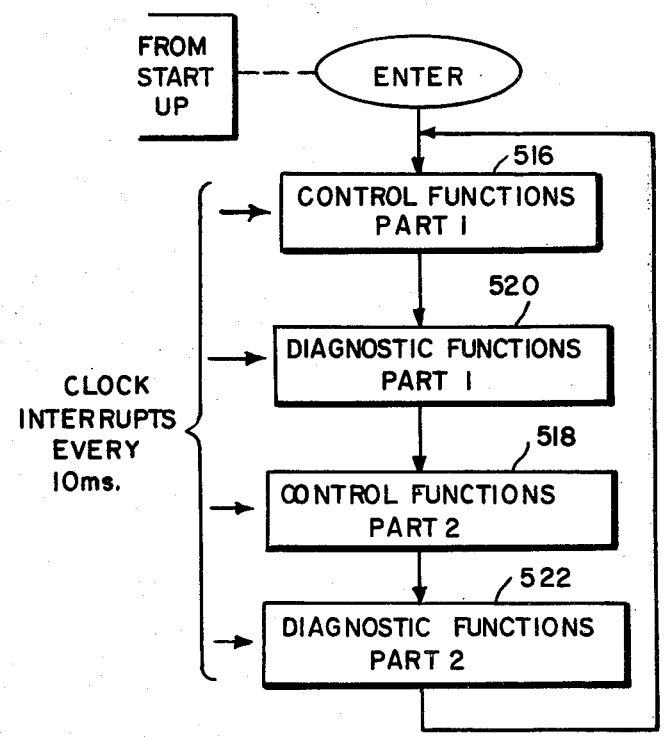

Referring to FIG. 7, during normal processing, the work of microprocessor 46 is split between performing control functions, as indicated in blocks 516 and 518, and diagnostic functions, as indicted in blocks 520 and 522. The control functions 516 and 518 are those functions in which the microprocessor controls and monitors the circuitry 12 and communicates with its control terminal, such as the video terminal 55 shown in FIG. 1. Such control, monitoring and communication functions are well known in the art of computer control circuits. The diagnostic functions 520 and 522 include checks upon the operating condition of the computer 14, such as RAM tests, ROM tests, and instruction set tests of the type that are well known to those skilled in the art of microcomputer diagnostic tests. As shown in FIG. 7, the control and diagnostic functions of the computer 14 are set up in the form of a cycle, called a control cycle, which is repeated at a period which ranges from approximately 20 to 200 millisecond, depending upon the number of control and diagnostic functions which are to be performed during that cycle. As shown in FIG. 7, the diagnostic functions are performed at two different points in the control cycle, so as to decrease the amount of time the computer is interrupted from performing its control functions at any one streach.

During the performance of the control cycle the interrupt counter 60 causes an interrupt signal to be sent to microprocessor 46 approximately once every ten milliseconds. Microprocessor 46 is of the type which can operate in either of two modes, a first called an interrupt enabled mode, in which an interrupt causes the microprocessor to temporarily stop what it is doing and perform an interrupt routine, and a second, called an interrupt disabled mode, in which it ignores interrupts. During normal operation microprocessor 46 operates in an interrupt enabled mode in which it responds to each of the interrupts generated by interrupt counter 60 by temporarily stopping its execution of the functions shown in FIG. 7 and by performing the bit-transmit interrupt subroutine shown in FIG. 9.

Figure 8:
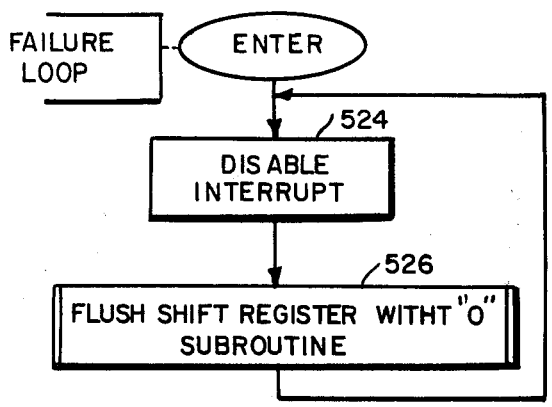

However, if during the performance of the control functions 516 and 518 or the diagnostic functions 520 and 522 of FIG. 7, the microprocessor finds an undesired operating condition, it enters a failure loop shown in FIG. 8 in which the microprocessor continuously keeps repeating two steps 524 and 526 and, thus which prevents it from emitting the bit sequence necessary to keep both relay 22 and the power supply to circuitry 12 on. In step 524 the microprocessor switches itself to an interrupt disabled state, so that it will no longer respond to the interrupts generated by the counter 60, preventing it from executing the bit-transmit instructions shown in FIG. 9. Then the failure loop executes step 526 in which it calls the flush routine of FIG. 6.

The microprocessor 46 enters the failure loop of FIG. 8 if a serious malfunction is detected by its diagnostic functions 520 and 522, such as a memory failure indicated by its RAM or ROM tests, or a microprocessor failure indicated by its instruction set test. Similarly, it enters that loop if a serious malfunction is detected by one of the plurality of reliability tests contained within the control functions 516 and 518. For example, all of the count values used to count timing intervals in controlling the circuitry 12 are stored in two separte registers, in one of which the count value is represented as a positive number and in the other of which the count value is represented as a corresponding negative number. Thus each time a count value is changed, one register has to be increased and the other register has to be decreased by the corresponding amount. The values in these registers are then tested to insure that they are complimentary, and if they are not, there is an indication that either the microprocessor 46 or the RAM 48 is unreliable, and the program enters the failure loop shown in FIG. 8. Similarly each time an output value is sent to the parallel I/O port 52 for the purpose of communicating either with shift register 66 or controlled circuitry 12, the value latched in interface 52 is immediately read back into microprocessor 46 to determine whether or not it equals the value which was just sent out. If it does not, there is an indication that either microprocessor 46 or parallel interface 52 is unreliable, and thus the computer enters the failure loop of FIG. 8. Another test which is performed during the performance of the control functions is range checking. For example, every time a message is sent through serial I/O port 54 to video terminal 55, a count is made of the number of characters sent in that message. In the present embodiment none of the messages which the computer is programmed to send are longer than forty characters in length. Thus if the count of characters sent in a message exceeds forty, there is an indication of an error, and the computer enters the failure loop of FIG. 8.

It should be obvious to those skilled in the art that many other forms of reliability tests could be performed during both the control functions and the diagnostic functions of FIG. 7 to cause computer 14 to enter an interrupt disabled state upon the detection of an undesirable operating condition.

Figure 9:
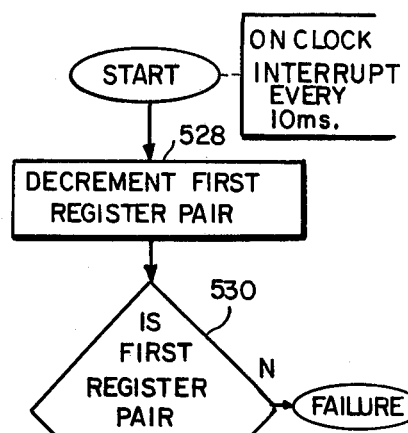

When microprocessor 46 is in an interrupted enabled mode, each time counter 60 generates an interrupt, the microprocessor will temporarily stop performing the functions of FIG. 7 and will enter the bit transmit interrupt routine shown in FIG. 9. The first step 528 performed upon entering the bit-transmit subroutine is the decrementing of the first bit-transmit register pair. This is the pair which had its address values set to minus one and plus one in the initialization routine shown in FIG. 5. Decrementing this register pair moves the value in each of its addresses one closer to zero. Thus for example, on the first time through the subroutine of FIG. 9 the values in the first register pair will both be set to zero. Once step 528 is completed the program advances to step 530 in which a check is made to determine whether the values in the two register pairs are consistent. This is performed by adding them and determining whether or not their sum is equal to zero. If the sum of the first register pair is not equal to zero, indicating that an error has been made by the computer 14, the program branches to the failure loop of FIG. 8, which repeatedly disables the interrupts of microprocessor 46 and causes shift register 66 to be cleared. This, in turn, causes the relay 22 to turn off and removes power from controlled circuitry 12.

However, if the value in the first bit-transmit registers pair is consistent, the program advances to step 532 in which the value of one of the registers of that pair is tested to see if it equals zero. If it does, as it will, for example, the first time the subroutine of FIG. 9 is entered after initialization, the program branches to the first bit subroutine of FIG. 10. In this subroutine the first step, step 534, involves resetting the values of the first register pair to minus three and plus three. Then in step 536 the value on the data line 62 is set to "0". Finally, in step 538 the microprocessor causes a strobe pulse to be generated on line 64, which causes the "0" value on data line 62 to be shifted into shift register 66. After completion of the first bit subroutine the program returns to step 540, which is the same step that the program advances to directly if the value of the first register pair is not zero.

Figure 10:
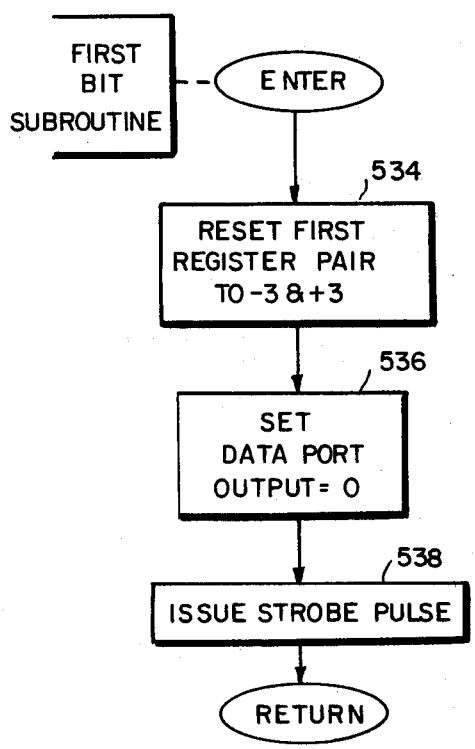
Figure 11:
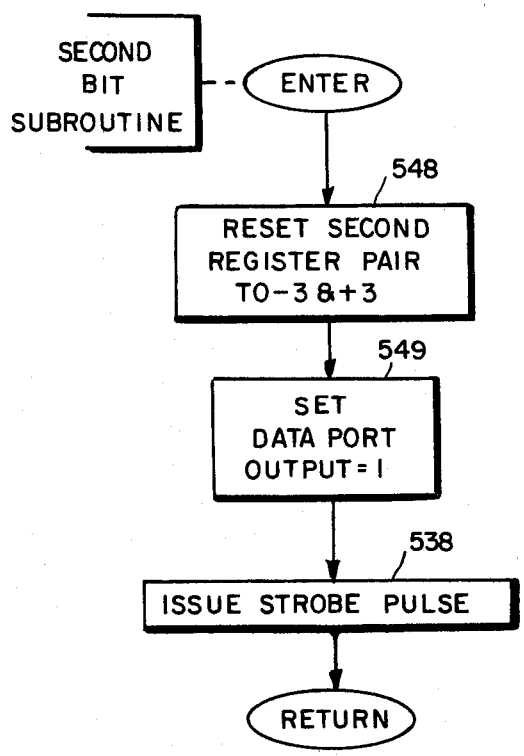
Figure 12:
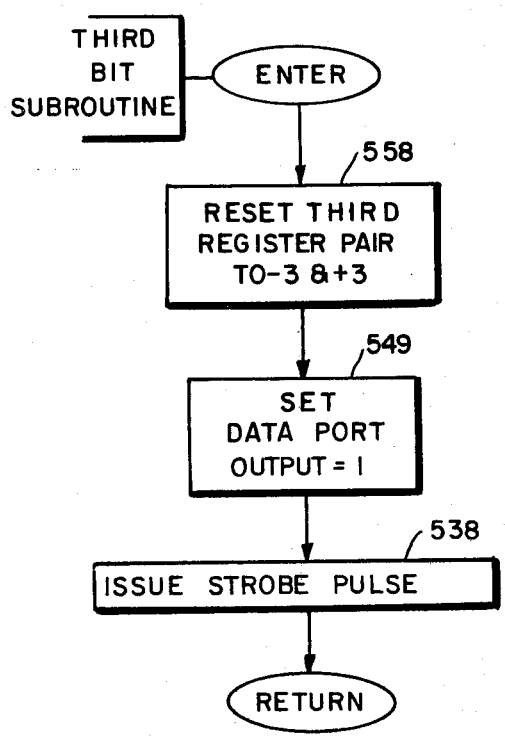

Steps 540 through 546 are very similar to steps 528 through 533. Thus in step 540 the second bit-transmit register pair has each of its address values made one closer to zero. In step 542 a test is made to see whether the sum of the second register pair is equal to zero. If it is not, the program enters a failure loop which causes the relay 22 to enter latch-out, removing power from circuitry 12. If, on the other hand, the values in the second register pair are complimentary, the program advances to step 554 which determines whether or not the value in those register pairs has reached zero. If it has, the program branches to the subroutine 546 which is shown in detail in FIG. 11. This subroutine is identical to the subroutine as shown in FIG. 10 except for the fact that its first step 548 resets the second register pair instead of the first and its second step 549 ultimately causes a "1" to be sent to shift register 66 instead of a "0".

After subroutine 546 is completed, or after a determination has been made at step 544 that the second register pair is not zero, the program advances to step 550. The programming contained in steps 550 through 556 is identical to that contained in steps 540 through 546, except that it is performed with regard to the third bit-transmit register instead of the second. Thus, in step 550 the third register pair is decremented so the value in each of its addresses is made one closer to zero. In step 552 a test is made to see whether the values in the third registered pair are consistent, and if they are not the program enters the failure loop of FIG. 8, which causes power to be removed from the circuitry 12. Otherwise a test is made at step 554 to determine whether the value of the third register pair is zero. If it is not, the bit-transmit subroutine of FIG. 9 is exited and program control is returned to the function of FIG. 7 that was being performed before the interrupt was generated. If, on the other hand, the third register pair is zero, the program branches to step 556, which is a call to the subroutine shown in FIG. 12. This subroutine is identical to that shown in FIG. 11, except that in its first step 558 the third register pair is reset rather than the second.

As is discussed above, the initialization procedure of FIG. 5 sets the value represented by the first bit-transmit register pair to one, the value represented by the second to two, and the value represented by the third to three. Each time the bit transmit interrupt subroutine of FIG. 9 is called, the value in each of the three bit-transmit register pairs is decremented by one and the register pair whose value is set to zero by that decrement has its corresponding bit subroutine of FIG. 10, 11 or 12 performed, and then its value reset to three. Thus, the first time the interrupt subroutine of FIG. 9 is called the decrementing causes the first register pair to equal zero and a "0" bit is sent out to shift register 66 according to the subroutine of FIG. 10. The second time the subroutine of FIG. 9 is called the second register pair has its value set to zero and a "1" is sent out to shift register 66 according to the routine of FIG. 11. And the third time that the subroutine of FIG. 9 is called, the third register pair has its value set to zero and a "1" is sent out to shift register 66 according to the subroutine of FIG. 12. This pattern of successively calling the subroutines of FIGS. 10, 11 and 12 each successive time an interrupt is generated is repeated, so that, under normal operating conditions, a bit pattern of "011" is repeatedly sent to shift register 66, which causes comparator 68 to generate a fail safe signal with has the predetermined frequency range, which, in turn, causes relay 22 to be turned on and power to be continuously supplied to the control circuitry 12.

It can be seen that the preferred embodiment of the invention described above provides means for removing power from circuitry to be controlled upon the occurrence of an undesired operating condition and for keeping that power removed from such circuitry until it is desired to reapply such power by means of a reset button. It can also be seen that the low pass characteristics of the optocoupler used in the relay actuating means of the above-described circuit causes that circuit to keep relay 22 on only so long as the fail-safe signal supplied to it has a frequency within a relatively narrow predetermined frequency range, decreasing the chance that relay 22 will be kept on by random oscillations. Similarly the use of comparator means 20 requires that the output from the computer 14 have a specific pattern in order for the fail-safe signal to have the proper frequency, further decreasing the likelihood that erroneous operation of computer 14 will enable power to be supplied to circuitry 12.

It should be understood that many varied embodiments of the present invention are possible. For example, a hard wired circuit could be used as means for generating the sequence of binary bits supplied to shift register 66 rather than the computer 14. It should also be understood that means 16 for generating the fail-safe signal could include analog circuitry for generating an analog fail-safe signal, rather than the digital circuitry shown in FIG. 1. In addition it should be clear that other types of low-pass means could be used in the relay actuating means other than the photo-resistive optocoupler described above. Also, it should be understood that other types of power control means can be used to remove power from the circuitry to be controlled when the fail-safe signal fails to be within its proper predetermined frequency range. And furthermore, it should be obvious to those skilled in the computer programming arts that many programs other than those disclosed above could be used to cause this invention to function as recited in the claims below.

Thus, there has been described above a new and improved fail-safe device having significant advantages over previous devices used in the prior art for regulating circuitry to be controlled. It should be appreciated that modifications to the described embodiment may be made by those of ordinary skill applying the principals of the present invention to different applications. Accordingly, the present invention should not be considered to be limited by the description herein of the preferred embodiment, but rather should be interpreted in accordance with the following claims.

What is claimed is:

1. A fail-safe device for removing power from circuitry to be controlled upon occurrence of an undesired operating condition, said device comprising:

means for generating a fail-safe signal which normally varies between signal levels at a frequency in a predetermined range between a minimum and a maximum frequency unless there is an undesired operating condition, said means for generating including a programmable computing means for controlling said circuitry to be controlled, said computing means having memory means containing bit-transmit instructions for causing said computing means to generate a sequence of binary bits in which a predetermined pattern of bits appears at a frequency within a range corresponding to said predetermined range unless there is an undesired operating condition; and comparator means for receiving said sequence of binary bits, for repeatedly comparing said sequence with a predetermined pattern, and for generating an output which varies in signal level in response to a match between said sequence and said predetermined pattern; and power control means responsive to the output of said comparator means for supplying power to said circuitry to be controlled only when said output of said comparator means has a frequency in said predetermined range, said power control means including an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed; relay actuating means, having power terminals and having low-pass means for transmitting only signal level variations in the output of said comparator means which occur below said maximum frequency, for supplying sufficient current to said electromagnet to keep said normally-open contacts closed when both power is supplied to said power terminals and said signal level variations have a frequency in said predetermined range; and latch-out means for preventing a sufficient current from being supplied to said electromagnet to close said normally-open contacts once said contacts have been opened, said latch-out means having means for supplying power to said relay actuating means through said normally-open contacts, so that once said contacts are opened said relay actuating means does not receive power and said relay enters latch-out, and reset means for selectively supplying sufficient current to said electromagnet to close said normally-open contacts and terminate said latch-out.

2. A fail-safe device for removing power from circuitry to be controlled upon occurrence of an undesired operating condition, said device comprising:
means for generating a fail-safe signal which normally varies between signal levels above a minimum frequency unless there is an undesired operating condition;
an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed;
relay actuating means having power terminals and being responsive to said fail-safe signal for supplying sufficient current to said electromagnet to keep said normally-open contacts closed when both power is supplied to said power terminals and said fail-safe signal level variations are above said minimum frequency;
means for supplying power to said relay actuating means through said normally-open contacts, so that once said normally-open contacts are opened said relay actuating means does not receive power and said relay enters latch-out; and
reset means for selectively supplying sufficient current to said electromagnet to close said normally-open contacts and terminate said latch-out.

3. A fail-safe device according to claim 2 in which said relay actuating means includes a switching means for switching between a first and a second state in response to said fail-safe signal level variations, storage capacitor, means for charging said storage capacitor when said switching means is in said firt state, and means for discharging said storage cpacitor through said electromagnet to supply current to said electromagnet when said switching means is in said second state.

4. A fail-safe device according to claim 2 in which said relay further includes normally-closed contacts which remain closed unless a sufficient current is supplied to said electromagnet to keep said normally-open contacts closed, and in which said reset means includes means for selectively supplying power to said relay actuating mens through said normally-closed contacts.

5. A fail-safe device according to claim 4 in which said means for selectively supplying power to said relay actuating means includes a transistor, having two current conducting electrodes and a control electrode which switches the conductance across said conducting electrodes between a first and a second state, a resistor connected in series with said conducting electrodes and a power supply, a connection between the junction of said resistor and said transistor and one power terminal of said relay actuating means through said normally-closed contacts for supplying power to said relay actuating means when said transistor is in said first state, a timing capacitor connected to said control electrode, a resistor for supplying charge to said timing capacitor so that after a given time the charge on said timing capacitor builds up to a level that switches said transistor to said second state, and a reset switch for selectively conducting charge away from said timing capacitor so as to return said transistor to said first state.

6. A fail-safe device according to claim 5 further including a zener diode between said capacitor and said control electrode.

7. A fail-safe device for removing power from circuitry to be controlled upon occurrence of an undesired operating condition, said device comprising:
means for generating a fail-safe signal which normally varies between signal levels at a frequency within a predetermined range between a minimum and a maximum frequency unless there is an undesired operating condition;
an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed; and
relay actuating means, having power terminals and having low-pass means for transmitting fail-safe signal level variations which occur below said maximum frequency, for supplying sufficient current to said electromagnet to keep said normally-open contacts closed when both power is supplied to said power terminals and said signal level variations have a frequency in said predetermined range.

8. A fail-safe device according to claim 7 in which said relay actuating means includes a switching means for switching between a first and a second state in response to said fail-safe signal level variations transmitted by said low-pass means, a storage capacitor, means for charging said storage capacitor when said switching means is in said first state, and means for discharging said storage capacitor through said electromagnet to supply current to said electromagnet when said switching means is in said second state.

9. A fail-safe device according to claim 7 in which said low-pass means includes a photo-resistive optocoupler.

10. A fail-safe device according to claim 7 further including latch-out means for preventing a sufficient current from being supplied to said electromagnet to close said normally-open contacts once said contacts have been opened, causing said relay to enter latch-out, said latch-out means having reset means for selectively supplying sufficient current to said electromagnet to close said normally-open contacts and terminate said latch-out.

11. A fail-safe device according to claim 10 in which said latch-out means includes means for supplying power to said relay actuating means through said normally-open contacts, so that once said normally-open contacts are opened said actuating means does not supply current to said electromagnet until said reset means closes said contacts.

12. A fail-safe device according to claim 10 in which said relay further includes normally-closed contacts which remain closed unless a sufficient current is supplied to said electromagnet to keep said normally-open contacts closed, and in which said reset means includes means for selectively supplying power to said relay actuating means through said normally-closed contacts.

13. A fail-safe device for removing power from circuitry to be controlled upon occurrence of an undesired operating condition, said device comprising:
  means for generating a sequence of binary bits in which a predetermined pattern of bits appears at a frequency within a range corresponding to a predetermined range between a minimum and a maximum frequency unless there is an undesired operating condition;
  comparator means for receiving said sequence of binary bits, for repeatedly comparing said sequence with a reference pattern, and for generating an output which varies in signal level in response to a match between said sequence and said reference pattern;
  an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed; and
  relay actuating means having power terminals and being responsive to the output of said comparator means for supplying sufficient current to said electromagnet to keep said normally-open contacts closed when both power is supplied to said power terminals and said signal level variations in said output of said comparator means occur above said minimum frequency.

14. A fail-safe device according to claim 13 in which said binary bits are successive in time and in which said comparator means includes, a shift register with a serial input and a parallel output for receiving said succession of bits and a parallel output for receiving said succession of bits and a comparator having a two parallel inputs, one of which is supplied with said reference pattern and the other of which receives as an input the output of said shift register, said comparator also having an output which produces on signal level when the patterns supplied to its two parallel inputs are equal and another signal level when they are not.

15. A fail-safe device according to claim 13 in which said relay actuating means includes a switching means for switching between a first and a second state in response to said signal level variations at said output of said comparator means, a storage capacitor, means for charging said storage capacitor when said switching means is in said first state, and means for discharging said storage capacitor through said electromagnet, to supply current to said electromagnet, when said switching means is in said second state.

16. A fail-safe device according to claim 13 in which said relay actuating means includes low-pass means for transmitting only signal level variations in said output of said comparator means which occur below a maximum frequency.

17. A fail-safe device according to claim 16 in which said low-pass means includes a photo-resistive optocoupler.

18. A fail-safe device according to claim 13 further including means for supplying power to said relay actuating means through said normally-open contacts, so that once said normally-open contacts are opened said relay actuating means does not receive power and said relay enter latch-out; and reset means for selectively supplying sufficient current to said electromagnet to close said normally-open contacts and terminate said latch-out.

19. A fail-safe device according to claim 18 in which said relay further includes normally-closed contacts which remain closed unless a sufficient current is supplied to said electromagnet to keep said normally-open contacts closed, and in which said reset means includes means for selectively supplying power to said relay actuating means through said normally-closed contacts.

20. A fail-safe device according to claim 13 in which said means for generating a sequence of binary bits includes a programmable computing means.

21. A fail-safe device for removing power from circuitry to be controlled upon occurrence of an undesired operating condition, said device comprising;
  means for generating a sequence of binary bits in which a predetermined pattern of bits appears at a frequency within a range corresponding to a predetermined frequency range unless there is an undesired operating condition;
  comparator means for receiving said sequency of binary bits, for repeatedly comparing said sequence with a reference pattern, and for generating an output which varies in signal level in response to a match between said sequence and said reference pattern;
  power control means responsive to the output of said comparator means for supplying power to said circuitry to be controlled only when said output of said comparator means has a frequency in said predetermined frequency range.

22. A fail-safe device according to claim 21 in which said power control means includes latch-out means for preventing said power control means from supplying power once it has stopped doing so, causing said power control means to enter latch-out, said latch-out means having reset means for selectively terminating said latch-out.

23. A fail-safe device according to claim 21 in which said binary bits are successive in time and in which said comparator means includes a shift register with a serial input and a parallel output for receiving said succession of bits and a comparator having a two parallel inputs, one of which is supplied with said reference pattern and the other of which receives as an input the output of said shift register, said comparator also having an output which produces one signal level when the patterns supplied to its two parallel inputs are equal and another signal level when they are not.

24. A fail-safe device according to claim 21 in which said means for generating a sequence of binary bits includes a programmable computing means.

25. A fail-safe device for removing power from circuitry to be controlled upon occurrence of an undesired operating condition, said devicing comprising:

programmable computing means for controlling said circuitry to be controlled, said computing means including memory means containing bit-transmit instructions for causing said computing means to generate as an output a sequence of binary bits in which a predetermined pattern of bits appears at a frequency within a range corresponding to a predetermined frequency range unless there is a undesired operating condition;

comparator means for receiving said sequence of binary bits, for repeatedly comparing said sequence with a reference pattern, and for generating an output which varies in signal level in response to a match between said sequence and said reference pattern;

power control means responsive to the output of said comparator means for supplying power to said circuitry to be controlled only when said output of said comparator means has a frequency in said predetermined frequency range.

26. A fail-safe device according to claim 25 in which said power control means includes latch-out means for preventing said power control means from supplying power once it has stopped doing so, causing said power control means to enter latch-out, said latch-out means having reset means for selectively terminating said latch-out.

27. A fail-safe device according to claim 25 in which said binary bits are successive in time and in which said comparator means includes a shift register with a serial input and a parallel output for receiving said succession of bits and a comparator having two parallel inputs, one of which is supplied with said reference pattern and the other of which receives as an input the output of said shift register, said comparator also having an output which produces one signal level when the patterns supplied to its two parallel inputs are equal and another signal level when they are not.

28. A fail-safe device according to claim 27 in which the bits produced by said computing means in the absence of said undesirable operating condition do not have an equal number of one and zero bits.

29. A fail-safe device according to claim 27 in which said shift register has a strobe input which must be supplied with a strobe signal for a bit supplied to said serial input to be received by said register and in which said bit-transmit instructions cause said computing means to supply a separate strobe signal to said strobe input for each bit of said sequence.

30. A fail-safe device according to claim 27 in which said bit-transmit instructions cause said computing means to produce one bit in said sequence each time said instructions are executed unless there is an undesired operating condition in said circuitry to be controlled or in said computing means, and in which said computing means includes an interrupt device for causing said computing means to periodically execute said bit-transmit instructions at a predetermined rate.

31. A fail-safe device for removing power from circuitry to be controlled upon occurrence of an undesired operating condition, said device comprising:

means for generating a fail-safe signal which normally varies between signal levels above a minimum frequency unless there is an undesired operating condition;

an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed;

relay actuating means having power terminals and being responsive to said fail-safe signal for supplying sufficient current to said electromagnet to keep said normally-open contacts closed when both power is supplied to said power terminals and said fail-safe signals level variations are above said minimum frequency, said relay actuating means including a switching means for switching between a first and a second state in response to said fail-safe signal level variations, a storage capacitor, means for charging said storage capacitor when said switching means is in said first state, and means for for discharging said storage capacitor through said electromagnet to supply current to said electromagnet when said switching means is in said second state;

reset means for selectively supplying sufficient current to said electromagnet to close said normally-open contacts when they are open; and means for supplying power to said relay actuating means through said normally-open contacts, so that once said normally-open contacts are opened said actuating means does not supply current to said electromagnet until said reset means closes said contacts.

32. A fail-safe device according to claim 31 in which said relay further includes normally-closed contacts which remain closed unless a sufficient current is supplied to said electromagnet to keep said normally-open contacts closed, and in which said reset means includes means for selectively supplying power to said relay actuating means through said normally-closed contacts.

33. A fail-safe device according to claim 32 in which said means for selectively supplying power to said relay actuating means includes a transistor, having two current conducting electrodes and a control electrode, which switches the conductance across said conducting electrodes between a first and a second state, a resistor connected in series with said conducting electrodes and a power supply, a connection between the junction of said resistor and said transistor and one power terminal of said relay actuating means through said normally-closed contacts for supplying power to said relay actuating means when said transistor is in said first state, a timing capacitor connected to said control electrode, a resistor for supplying charge to said timing capacitor so that after a given time the charge on said timing capacitor builds up to a level that switches said transistor to said second state, and a reset switch for selectively conducting charge away from said timing capacitor so as to return said transistor to said first state.

34. A fail-safe device according to claim 33 further including a zener diode between said capacitor and said control electrode.

35. A fail-safe device according to claim 31 in which said means for generating a fail-safe signal includes means for generating a sequence of binary bits in which a predetermined pattern of bits appears above a frequency corresponding to said minimum frequency unless there is an undesired operating condition; and comparator means for receiving said sequence of binary bits, for repeatedly comparing said sequence with a reference pattern, and for generating an output which varies in signal level in response to a match between said sequence and said reference pattern.

36. A fail-safe device according to claim 35 in which said binary bits are successive in time and in which said comparator means includes a shift register with a serial input and a parallel output for receiving said successive bits and a comparator having two parallel inputs, one of which is supplied with said reference pattern and the other of which receives as an input the output of said shift register, said comparator also having an output which produces one signal level when the patterns, supplied to its two parallel inputs are equal and another signal level when they are not.

37. A fail-safe device according to claim 31 in which said relay actuating means includes a low-pass means for transmitting only fail-safe signal level variations which occur below a maximum frequency.

38. A fail-safe device according to claim 37 in which said low-pass means includes a photo-resistive optocoupler.

39. A fail-safe device according to claim 31 in which said means for generating a fail-safe signal includes programmable computing means for controlling said circuitry to be controlled and memory means containing bit-transmit instructions for causing said computing means to generate as an output a sequence of binary bits in which a predetermined pattern of bits appears above a frequency corresponding to said minimum frequency unless there is an undesired operating condition in said circuitry to be controlled or in said computing means.

40. A fail-safe device for removing power from circuitry to be controlled upon occurrence of an undesired operating condition, said devicing comprising:
    means for generating a fail-safe signal which normally varies between signal levels at a frequency in a predetermined range between a minimum and a maximum frequency unless there is an undesired operating condition;
    an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed;
    relay actuating means having power terminals and having low-pass means for transmitting only fail-safe signal level variations which occur below said maximum frequency, for supplying sufficient current to said electromagnet to keep said normally-open contacts closed when both power is supplied to said power terminals and the frequency of said fail-safe signal level variations are within said predetermined range, said relay actuating means including a switching means for switching between a first and a second state in response to said fail-safe signal level variations transmitted by said low-pass means, a storage capacitor, means for charging said storage capacitor when said switching means is in said first state, and means for discharging said storage capacitor through said electromagnet to supply current to said electromagnet when said switching means is in said second state; and
    latch-out means for preventing a sufficient current from being supplied to said electromagnet to close said normally-open contacts once said contacts have been opened, causing said relay to enter latch-out, said latch-out means having reset means for selectively supplying sufficient current to said electromagnet to close said normally-open contacts and terminate said latch-out.

41. A fail-safe device according to claim 40 in which said latch-out means includes means for supplying power to said relay actuating means through said normally-open contacts, so that once said normally-open contacts are opened said actuating means does not supply current to said electromagnet until said reset means closes said contacts.

42. A fail-safe device according to claim 40 in which said low-pass means includes a photo-resistive optocoupler.

43. A fail-safe device according to claim 40 in which said means for generating a fail-safe signal includes means for generating a sequence of binary bits in which a predetermined pattern of bits appears at a frequency within a range corresponding to said predetermined range unless there is an undesired operating condition; and comparator means for receiving said sequence of binary bits, for repeatedly comparing said sequence with a reference pattern, and for generating an output which varies in signal level in response to a match between said sequence and said reference pattern.

44. A fail-safe device according to claim 43 in which said binary bits are successive in time and in which said comparator means includes a shift register with a serial input and a parallel output for receiving said successive bits and a comparator having two parallel inputs, one of which is supplied with said reference pattern and the other of which receives as an input the output of said shift register, said comparator also having an output which produces one signal level when the pattern supplied to its two parallel inputs are equal and another signal level when they are not.

45. A fail-safe device according to claim 44 in which said means for generating a sequence of binary bits includes programmable computing means for controlling said circuitry to be controlled and memory means containing bit-transmit instructions for causing said computing means to generate a sequence of binary bits in which a predetermined pattern of bits appears above a frequency corresponding to said minimum frequency unless there is an undesired operating condition in said circuitry to be controlled or in said computing means.

46. A fail-safe device according to claim 45 in which said shift register has a strobe input which must be supplied with a strobe signal for a bit supplied to said serial input to be received by said register and in which said instructions cause said computing means to supply a separate strobe signal to said strobe input for each bit of said sequence.

47. A fail-safe device for removing power from circuitry to be controlled upon occurrence of an undesired operating condition, said device comprising:
    means for generating a fail-safe signal which normally varies between signal levels above a minimum frequency unless there is an undesired operating condition, said means including programmable computing means for controlling said circuitry to be controlled and memory means containing bit-transmit instructions for causing said computing means to generate a sequence of binary bits in which a predetermined pattern of bits appears above a frequency corresponding to said minimum frequency unless there is an undesired operating condition;

an electromechanical relay for supplying power to said circuitry to be controlled, said relay having an electromagnet and normally-open mechanical relay contacts through which power is supplied to said circuitry, which normally-open contacts remain open unless a sufficient current is supplied to said electromagnet to keep them closed;

relay actuating means having power terminals and being responsive to said fail-safe signal for supplying sufficient current to said electromagnet to keep said normally-open contacts closed when both power is supplied to said power terminals and said fail-safe signal level variations are above said minimum frequency, said relay actuating means including a switching means for switching between a first and a second state in response to said fail-safe signal level variations, a storage capacitor, means for charging said storage capacitor when said switching means is in said first state, and means for discharging said storage capacitor through said electromagnet to supply current to said electromagnet when said switching means is in said second state; and latch-out means for preventing a sufficient current from being supplied to said electromagnet to close said normally-open contacts once said contacts have been opened, causing said relay to enter latch-out, said latch-out means having reset means for selectively supplying sufficient current to said electromagnet to close said normally-open contacts and terminate said latch-out.

48. A fail-safe device according to claim 47 in which said latch-out means includes means for supplying power to said relay actuating means through said normally-open contacts, so that once said normally-open contacts are opened said actuating means does not supply current to said electromagnet until said reset means closes said contacts.

49. A fail-safe device according to claim 47 in which said relay actuating means includes a low-pass means for transmitting only fail-safe signal level variations which occur below a maximum frequency.

50. A fail-safe device according to claim 49 in which said low-pass means includes a photo-resistive optocoupler.

51. A fail-safe device according to claim 47 in which said means for generating a fail-safe signal includes comparator means for receiving said sequence of binary bits, for repeatedly comparing said sequence with a reference pattern, and for generating an output which varies in signal level in response to a match between said sequence and said reference pattern.

52. A fail-safe device according to claim 51 in which said binary bits are successive in time and in which said comparator means includes a shift register with a serial input and a parallel output for receiving said succession of bits and a comparator having two parallel inputs, one of which is supplied with said reference bit pattern and the other of which receives as an input the output of said shift register, said comparator also having an output which produces one signal level when the pattern supplied to its two parallel inputs are equal and another signal level when they are not.

* * * * *

UNITED STATES PATENT AND TRADEMARK OFFICE
CERTIFICATE OF CORRECTION

PATENT NO. : 4,398,233

DATED : August 9, 1983

INVENTOR(S) : Charles R. Boswell, Jr. and John L. Bala

It is certified that error appears in the above—identified patent and that said Letters Patent is hereby corrected as shown below:

Column 3, line 26, change "normlly" to --normally--

Column 3, line 35, change "it" to --its--

Column 3, line 63, change "emboding" to --embodying--

Column 5, line 63, change "generted" to --generated--

Column 6, line 19, change "in" to --is--

Column 9, line 19, change "third" to --thirty--

Column 9, line 42, change "accidentaly" to --accidently--

Column 9, line 46, change "discused" to --discussed--

Column 10, line 30, change "advance" to --advances--

Column 10, lines 41-42, change "schematicly" to --schematically--

UNITED STATES PATENT AND TRADEMARK OFFICE
CERTIFICATE OF CORRECTION

PATENT NO. : 4,398,233
DATED : August 9, 1983
INVENTOR(S) : Charles R. Boswell, Jr. and John L. Bala It is certified that error appears in the above—identified patent and that said Letters Patent is hereby corrected as shown below:

Column 10, line 68, change "streach" to --stretch--

Column 11, line 39, change "separte" to --separate--

Claim 3, col. 15, line 58, change "firt" to --first--

Claim 3, col. 15, line 59, change "cpacitor" to --capacitor--

Claim 4, col. 16, line 2, change "mens" to --means--

Claim 31, col. 20, line 19, delete "for", second occurrence

Signed and Sealed this

First Day of May 1984

[SEAL]

Attest:

GERALD J. MOSSINGHOFF

Attesting Officer

Commissioner of Patents and Trademarks